United States Patent
Lu et al.

(10) Patent No.: US 8,469,156 B2
(45) Date of Patent: Jun. 25, 2013

(54) SEQUENTIAL BRAKE CONTROL DEVICE FOR A CYCLE

(76) Inventors: Frank Lu, Taoyuan (TW); I-Wei Lu, Taoyuan (TW); Yi-Hsin Lu, Taoyuan (TW)

(*) Notice: Subject to any disclaimer, the term of this patent is extended or adjusted under 35 U.S.C. 154(b) by 230 days.

(21) Appl. No.: 13/048,841

(22) Filed: Mar. 15, 2011

(65) Prior Publication Data
US 2012/0234633 A1    Sep. 20, 2012

(51) Int. Cl.
*B62L 3/00* (2006.01)

(52) U.S. Cl.
USPC .................. 188/24.22; 188/24.12; 188/24.15; 188/2 D (58) Field of Classification Search
USPC ............. 188/24.22, 24.12, 24.15, 24.16, 2 D, 188/204 R; 74/500.5, 501.6, 502.2, 502.4
See application file for complete search history.

(56) References Cited

U.S. PATENT DOCUMENTS

| | | | | |
|---|---|---|---|---|
| 4,057,127 A * | 11/1977 | Woodring | ................. | 188/24.16 |
| 4,773,510 A * | 9/1988 | Sato | ........................... | 188/24.16 |
| 6,098,486 A * | 8/2000 | Liao | ............................ | 74/500.5 |
| 6,186,282 B1 * | 2/2001 | Juan | ............................ | 188/24.16 |
| 6,662,675 B2 * | 12/2003 | Lee et al. | ..................... | 74/500.5 |
| 8,210,322 B2 * | 7/2012 | Guh | ............................ | 188/24.22 |
| 8,261,887 B2 * | 9/2012 | Tseng | ........................ | 188/24.22 |

\* cited by examiner

*Primary Examiner* — Pamela Rodriguez
(74) *Attorney, Agent, or Firm* — patenttm.us (57) ABSTRACT

A sequential brake control device for a cycle has a sliding connector and a front delaying and anti-lock spring set to serve to sequentially actuate a brake. A left lever cable and a right lever cable are commonly connected to the sliding connector. A front brake cable passes through the sliding connector and the front delaying and anti-lock spring set and is mounted in a front brake cable block abutting against the front delaying and anti-lock spring set. A rear brake cable may alternatively pass through the sliding connector and a rear suspension spring and is mounted in a rear brake cable block abutting against the rear suspension spring. When one or both brake levers are squeezed, a rear wheel is stopped before the front wheel does. The front and rear wheels are slowed down in speed first when a brake is applied and fully stopped at a lower speed of the cycle.

8 Claims, 8 Drawing Sheets

SEQUENTIAL BRAKE CONTROL DEVICE FOR A CYCLE

BACKGROUND OF THE INVENTION

1. Field of the Invention

The present invention relates to a brake control device for a cycle, such as a bicycle or a motorcycle, and more particularly to a brake control device capable of sequentially controlling to stop the movement of the rear wheel and the front wheel of the cycle.

2. Description of the Related Art

To slow down the speed of a cycle, it is essential for the cycle to be equipped with a brake device to ensure the cycling safety. Basically, cyclists can actuate the brake device by squeezing the left or right brake lever of the cycle. However, there are no clear rules globally recognized as to which brake lever should be squeezed to brake the front or rear wheel. During an emergency, a cyclist may abruptly squeeze a brake lever and inadvertently lock up the front wheel of the cycle. As the rear wheel is still rotating forward, the rear wheel is lifted up with respect to a contact point of the front wheel. When the left and right brake levers are both squeezed to the full extent of their travel, the front wheel and the rear wheel are both locked up. Due to the effect of inertia, the cycle easily slips on the ground. In both cases the cyclist can be easily thrown from the cycle and get injured or even killed in the accident.

The occurrence of the cycling accident has nothing to do with the brake device of the cycle. Instead, regardless of what type of brake device is equipped, such accident is blamed to the ignorance of cyclists, who seldom remember which brake lever controls the braking of the front wheel or rear wheel, and brake control over the front wheel only is dangerous. Although the best brake control mode is performed by simultaneously squeezing the left and right brake levers and alternately applying and releasing the brake just like the operation of an ABS (Antilock Brake System), cyclists may be too panicked to remember or obey the above rule. So, tragic events happen from time to time.

Although conventional brake devices can simultaneously apply brakes to front wheels and rear wheels, the gap adjustment between a brake shoe and the rim of each one of the front wheel and the rear wheel is not taken into account. It happens that the gap between the brake shoe and the rim of the front wheel is shorter than that between the brake shoe and the rim of the rear wheel. Besides, the brake cable to a front wheel is shorter than the brake cable to the rear wheel. As a result, even when both left and right levers are squeezed, it is still likely that the front wheel is stopped first. Cyclists neither pay any attention to the gap adjustment between the brake shoe and the rim of each one of the front wheel and the rear wheel nor have professional tools for the correct gap adjustment.

SUMMARY OF THE INVENTION

An objective of the present invention is to provide a sequential brake control device for a cycle capable of sequentially stopping movement of the rear wheel and front wheel of the cycle.

To achieve the foregoing objective, the sequential brake control device is adapted to connect to a left brake lever and a right brake lever and adapted to be mounted between a front brake and a rear brake of the cycle. The sequential brake control device has a housing, a sliding connector, a front delaying and anti-lock spring set, a lever control cable set and a brake control cable set.

The housing has a top and a bottom, a chamber and a top cover and a bottom cover. The chamber is defined in the housing. The top cover and the bottom cover respectively cover the top and the bottom of the housing. The sliding connector is movably mounted in the chamber of the housing, is movable in a top-down direction and has a top board, a bottom board and a support frame. The top board has a bottom. The bottom board has a top. The support frame is mounted between the top board and the bottom board.

The front delaying and anti-lock spring set is mounted in the sliding connector and has a front anti-lock spring and a front suspension spring. The front anti-lock spring has a top end and a bottom end. The front suspension spring is mounted in the front anti-lock spring and has a top end and a bottom end. When the front suspension spring and the front anti-lock spring are mounted in the sliding connector, the bottom ends of the front suspension spring and the front anti-lock spring abut against the top of the bottom board, and the top end of the front suspension spring protrudes beyond a top end of the front anti-lock spring.

The lever control cable set has a left lever cable and a right lever cable. One end of each of the left lever cable and the right lever cable is connected to a corresponding one of the left lever and the right lever. The other end of each of the left lever cable and the right lever cable penetrates through the top cover of the housing, is connected to the top board of the sliding connector, and is securely mounted in a corresponding one of the left lever block and the right lever block.

The brake control cable set has a front brake cable block, a front brake cable, a rear brake cable block and a rear brake cable. The front brake cable block is movably mounted between the top end of the front suspension spring and the bottom of the top board of the sliding connector, abuts against the top end of the front suspension spring, and has a bottom. One end of the front brake cable sequentially penetrates through the front suspension spring and the first anti-lock spring of the front delaying and anti-lock spring set, the bottom board of the sliding connector and the bottom cover of the housing to be adapted to connect with the front brake. The other end of the front brake cable is securely mounted in the bottom of the front brake cable block. The rear brake cable block is mounted on the top of the bottom board and has a bottom. One end of the rear brake cable sequentially penetrates through the bottom board of the sliding connector and the bottom cover of the housing to be adapted to connect with the rear brake. The other end of the rear brake cable is securely mounted in the bottom of the rear brake cable block.

Alternatively, the sequential brake control device is adapted to connect to a left brake lever and a right brake lever and adapted to be mounted between a front brake and a rear brake of the cycle. The brake control device has a housing, a sliding connector, a front delaying and anti-lock spring set, a lever control cable set and a brake control cable set.

The housing has a top and a bottom, a chamber and a top cover and a bottom cover. The chamber is defined in the housing. The top cover and the bottom cover respectively cover the top and the bottom of the housing.

The sliding connector is movably mounted in the chamber of the housing, is movable in a top-down direction, and has a top board, a bottom board and a support frame. The top board has a bottom. The bottom board has a top. The support frame is mounted between the top board and the bottom board.

The front delaying and anti-lock spring set is mounted in the sliding connector and has a top end and a bottom end, a suspension section and an anti-lock section. The suspension section has a bottom end. The anti-lock section is formed on the bottom end of the suspension section, and has a larger pitch than that of the suspension section. The bottom end of the anti-lock section abuts against the top of the bottom board.

The lever control cable set has a left lever cable and a right lever cable. One end of each of the left lever cable and the right lever cable is connected to a corresponding one of the left lever and the right lever. The other end of each of the left lever cable and the right lever cable penetrates through the top cover of the housing, is connected to the top board of the sliding connector, and is securely mounted in a corresponding one of the left lever block and the right lever block.

The brake control cable set has a front brake cable block, a front brake cable, a rear brake cable block and a rear brake cable. The front brake cable block is movably mounted between the top end of the front delaying and anti-lock spring set and the bottom of the top board of the sliding connector, abuts against the top end of the front delaying and anti-lock spring set, and has a bottom. One end of the front brake cable sequentially penetrates through the front delaying and anti-lock spring set, the bottom board of the sliding connector and the bottom cover of the housing to be adapted to connect with the front brake. The other end of the front brake cable is securely mounted in the bottom of the front brake cable block. The rear brake cable block is mounted on the top of the bottom board and has a bottom. One end of the rear brake cable sequentially penetrates through the bottom board of the sliding connector and the bottom cover of the housing to be adapted to connect with the rear brake. The other end of the rear brake cable is securely mounted in the bottom of the rear brake cable block.

The advantages of the present invention lie in that with the sequential brake control device applied to a cycle, the rear wheel is stopped before the front wheel does, and as the cycle is cycling and the brake is activated by squeezing one or both of the left brake lever and the right brake lever, the front wheel and the rear wheel of the cycle are fully stopped at a slower speed. Except that the front brake is suspended for a short period of time, the front and rear brakes effectively perform in a continuous and progressive pattern, namely, delay, slightly stop, heavily stop and fully stop. As the front brake is delayed by the front suspension spring and the anti-lock spring, an intended brake action having 30 percent of braking force exerted to stop the front wheel and 70 percent of braking force exerted to stop the rear wheel at a condition not fully locking up the front wheel. After a single brake action is initiated by squeezing the left brake lever, the right brake lever or both, the rest of the process to stop the wheels is taken control by the sequential brake control device which is more effective than the manual control by alternately squeezing the left and right brake levers for the sake of the manual control occupying half of the braking process. The sequential brake control device only slightly suspends right after a brake action is initiated, and the front and rear brakes fully participate in the continuous and progressive braking process right after the suspension time.

Additionally, the sequential brake control device can be mounted beneath the handle bar and has a compact size without occupying too much space. The left and right lever cables enter the housing of the sequential brake control device from the top cover to connect to the sliding connector, and the front and rear brake cables can be mounted through the bottom cover of the housing so that the sequential brake control device is applicable to all types of cycles.

Other objectives, advantages and novel features of the invention will become more apparent from the following detailed description when taken in conjunction with the accompanying drawings.

DETAILED DESCRIPTION OF THE INVENTION

Figure 1:
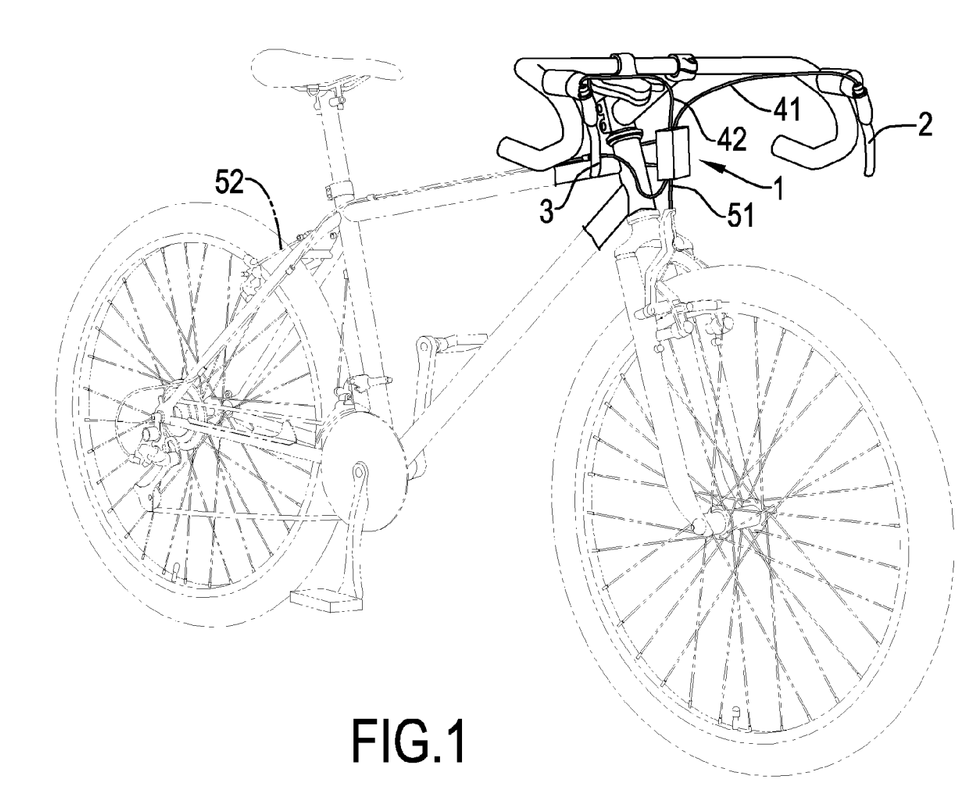
FIG. 1 is a perspective view of a bicycle with a sequential brake control device in accordance with the present invention.
Figure 2:
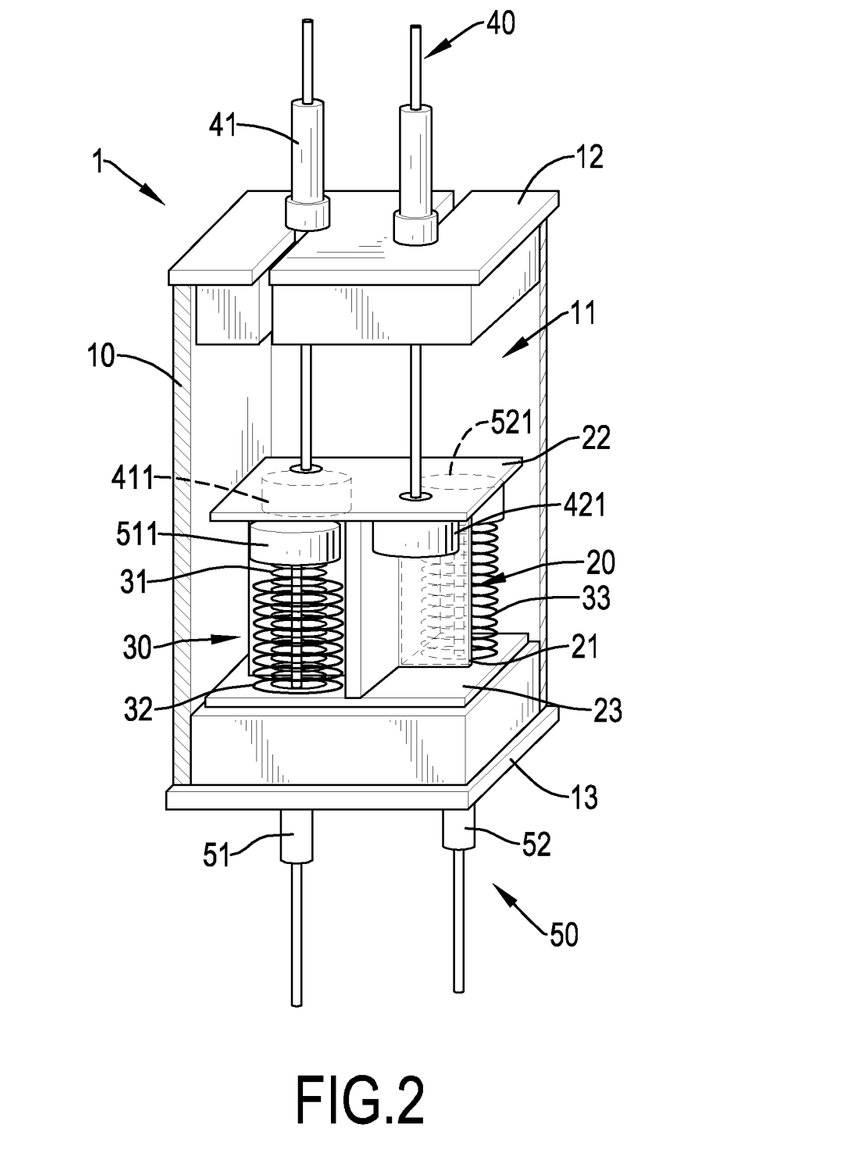
FIG. 2 is an enlarged partial perspective view in partial section of the sequential brake control device in FIG. 1.
Figure 3:
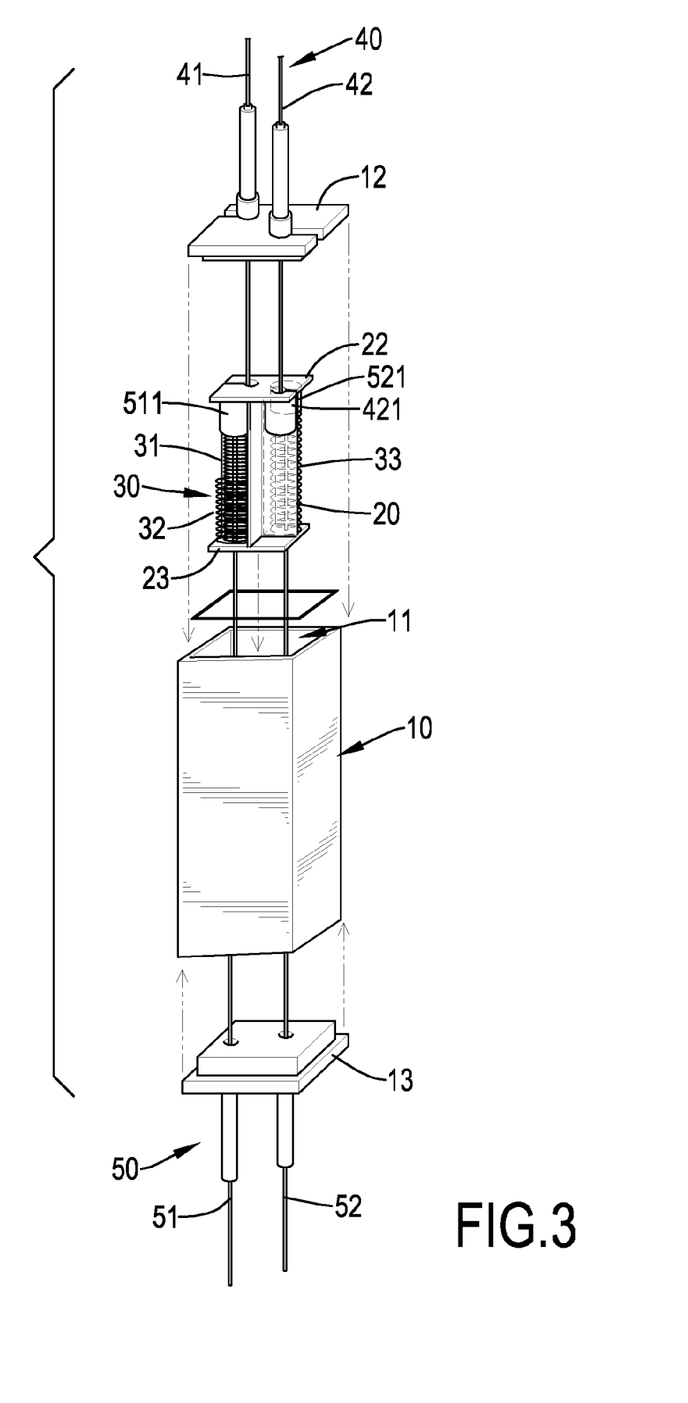
FIG. 3 is a partially exploded perspective view of the sequential brake control device in FIG. 2.
Figure 4A:
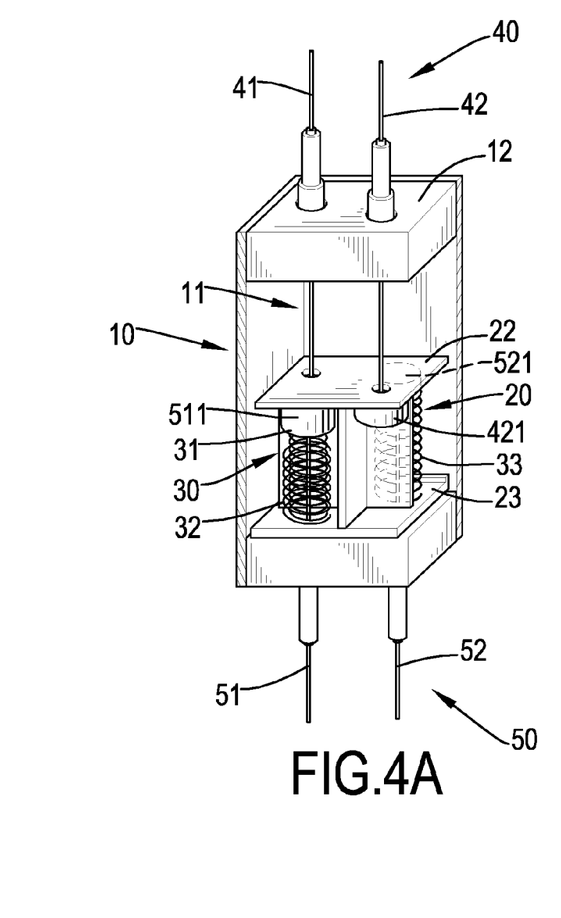
FIG. 4A is a first operational perspective view of the sequential brake control device in FIG. 2.
Figure 4B:
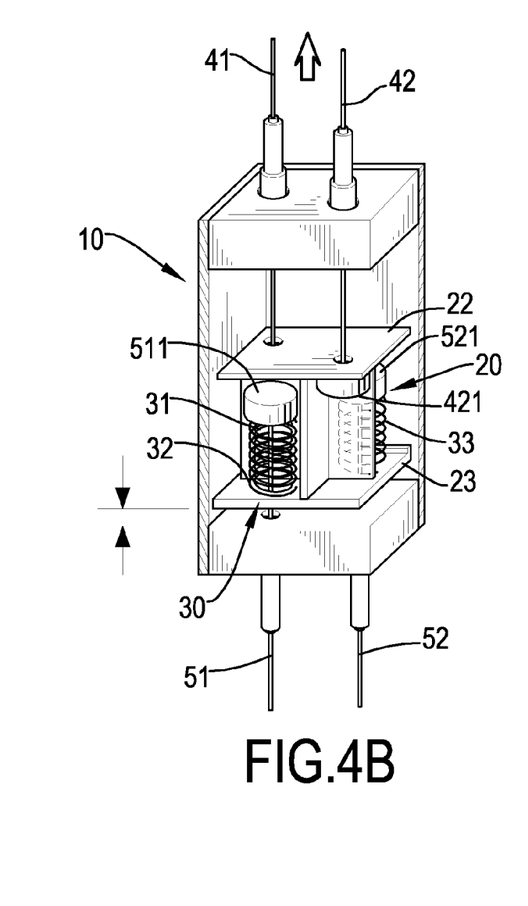
FIG. 4B is a second operational perspective view of the sequential brake control device in FIG. 2.
Figure 4C:
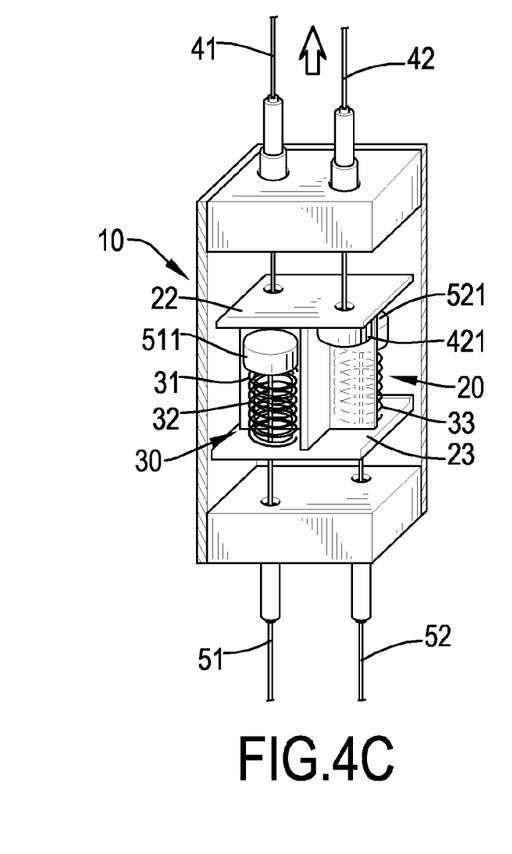
FIG. 4C is a third operational perspective view of the sequential brake control device in FIG. 2.
Figure 4D:
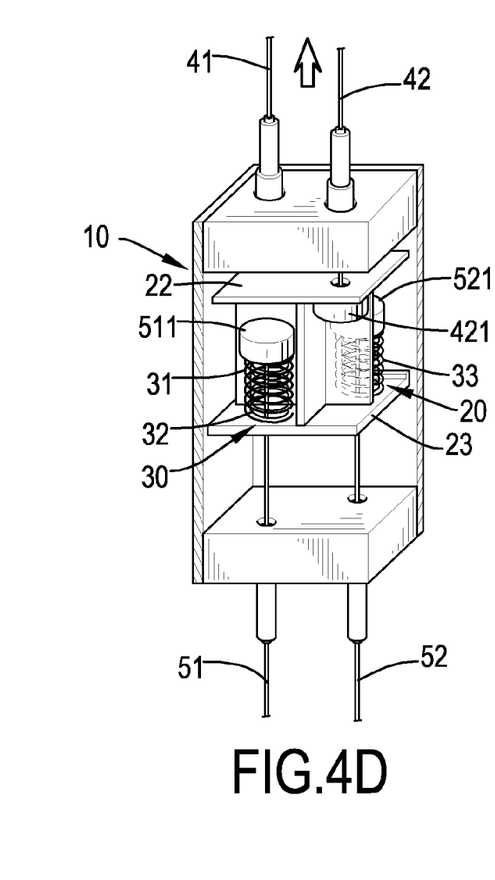
FIG. 4D is a fourth operational perspective view of the sequential brake control device in FIG. 2.

With reference to FIGS. 1 to 3, a brake control device 1 for a cycle in accordance with the present invention is connected to a left brake lever 2 and a right brake lever 3 and mounted between a front brake and a rear brake, and has a housing 10, a sliding connector 20, a front delaying and anti-lock spring set 30, a lever control cable set 40 and a brake control cable set 50.

The housing 10 has a chamber 11, two open sides, a top cover 12 and a bottom cover 13. The chamber 11 is defined in the housing 10. The two open sides are formed through a top and a bottom of the housing 10. The top cover 12 and the bottom cover 13 respectively cover the two open sides. The housing 10 may be cubic, cylindrical or in any other geometrical shape. The top cover 12 and the bottom cover 13 being square, circular or taking the forms of other corresponding shapes respectively cover the two open sides. In the present embodiment, each of the top cover 12 and the bottom cover 13 has round through holes and open slots respectively formed therethrough for brake cables to penetrate through the housing 10.

The sliding connector 20 is movably mounted in the chamber 11 of the housing 10, is movable in a top-down direction, and has a support frame 21, a top board 22 and a bottom board 23. The top board 22 and the bottom board 23 are respectively mounted on a top and a bottom of the support frame 21. In the present embodiment, the support frame 21 is cross-shaped from the viewpoint looking down from the top of the support frame 21, and divides a space between the top board 22 and the bottom board 23 into four segments.

Figure 5A:
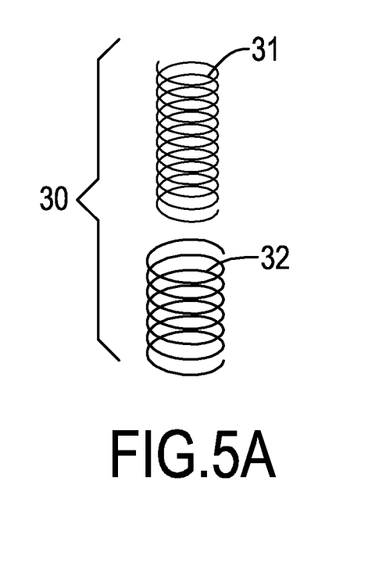
FIG. 5A is an enlarged exploded perspective view of an embodiment of a front wheel suspension and anti-lock spring set of the sequential brake control device in FIG. 2.
Figure 5B:
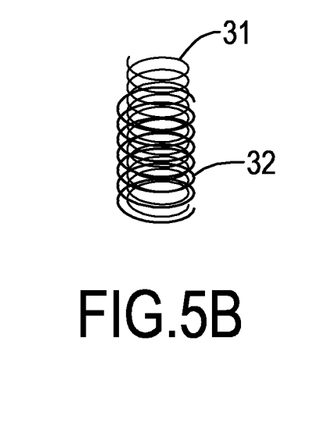
FIG. 5B is a perspective view of the front wheel suspension and anti-lock spring set in FIG. 5A.
Figure 5C:
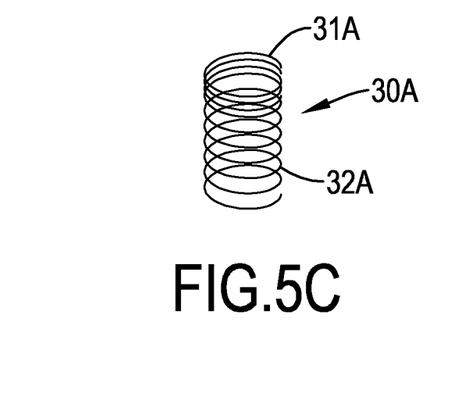
FIG. 5C is an enlarged perspective view of another embodiment of the front wheel suspension and anti-lock spring set of the sequential brake control device in FIG. 2.
Figure 6A:
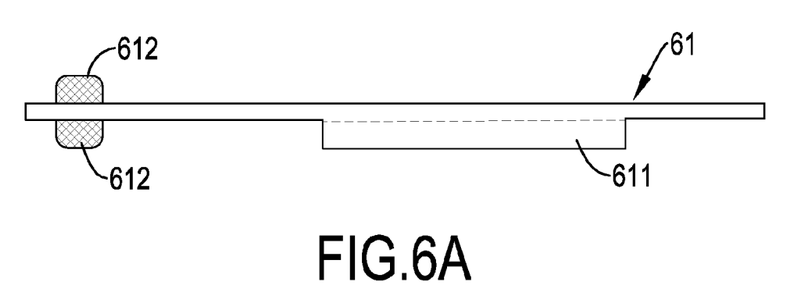
FIG. 6A is an enlarged front view of an embodiment of a brake gap adjustment module of the sequential brake control device in FIG. 2.
Figure 6B:
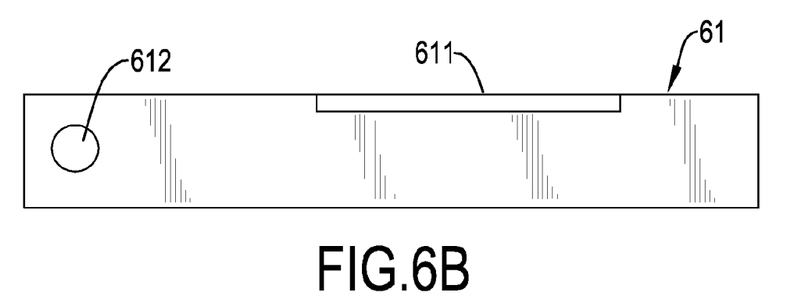
FIG. 6B is a bottom view of the brake gap adjustment module of the sequential brake control device in FIG. 6A.
Figure 6C:
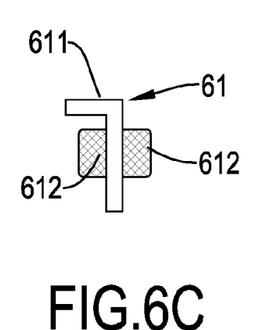
FIG. 6C is a side view of the brake gap adjustment module of the sequential brake control device in FIG. 6A.
Figure 6D:
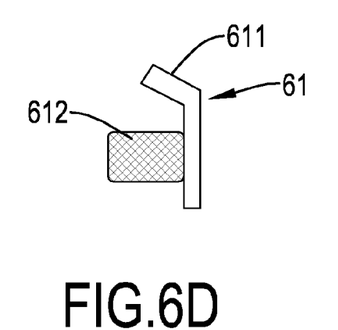
FIG. 6D is a side view of another embodiment of the brake gap adjustment module of the sequential brake control device in FIG. 2.

With reference to FIGS. 5A and 5B, the front delaying and anti-lock spring set 30 is mounted in the sliding connector 20, and has a front anti-lock spring 32 and a front suspension spring 31. The front suspension spring 31 is mounted in the front anti-lock spring 32. The front suspension spring 31 is narrower in diameter and longer in length and has a smaller spring constant relative to the front anti-lock spring 32. When the front suspension spring 31 and the front anti-lock spring 32 are mounted in the sliding connector 20, bottom ends of the front suspension spring 31 and the front anti-lock spring 32 abut against a top of the bottom board 23, and a top end of the front suspension spring 31 protrudes beyond a top end of the front anti-lock spring 32. With reference to FIG. 5C, the front suspension spring 31 and the front anti-lock spring 32 are integrally formed as a single front suspension and anti-lock spring 30A. The front suspension and anti-lock spring 30A is mounted in the sliding connector 20 and has a suspension section 31A and an anti-lock section 32A. The anti-lock section 32A is formed on a bottom end of the suspension section 31A, and has a larger pitch than that of the suspension section 31A. A bottom end of the anti-lock section 32A abuts against the top of the bottom board 23. As the suspension section 31A and the anti-lock section 32A have two different pitches, when applied with a force, the front suspension and anti-lock spring 30A first suspends the force with the suspension section 31A and then prevents itself from being excessively compressed with the anti-lock section 32A.

The brake control device 1 may further have a rear suspension spring 33 mounted in the sliding connector 20 and beside the front delaying and anti-lock spring set 30. A bottom end of the rear suspension spring 33 abuts against the top of the bottom board 23.

The lever control cable set 40 has a left lever block 411, a right lever block 421, a left lever cable 41 and a right lever cable 42. The left lever block 411 and the right lever block 421 abut against a bottom of the top board 22. One end of each of the left lever cable 41 and the right lever cable 42 is connected to a corresponding one of the left lever 2 and the right lever 3. The other end of each of the left lever cable 41 and the right lever cable 42 sequentially penetrates through the top cover 12 of the housing 10 and the top board 22 of the sliding connector 20 to enter one of the two diagonal segments divided by the support frame 21, and is securely mounted in a top of a corresponding one of the left lever block 411 and the right lever block 421. When any one of the left lever 2 and the right lever 3 is squeezed, a corresponding one of the left lever cable 41 and the right lever cable 42 is pulled, a corresponding one of the left lever block 411 and the right lever block 421 is lifted up, and the sliding connector 20 is moved upwardly inside the housing 10. In the present embodiment, the left lever cable 41 and the right lever cable 42 are respectively and integrally formed in the left lever block 411 and the right lever block 421, and hence do not need to be fastened by screws, thereby enhancing reliability and safety when the left lever cable 41 or the right lever cable 42 is pulled.

The brake control cable set 50 has a front brake cable 51, a front brake cable block 511, a rear brake cable 52 and a rear brake cable block 521. One end of the front brake cable 51 sequentially penetrates through the front suspension spring 31 and the front anti-lock spring 32 of the front delaying and anti-lock spring set 30, the bottom board 23 of the sliding connector 20 and the bottom cover 13 of the housing 10 to be connected with the front brake. The front brake cable block 511 is movably mounted between a top end of the front suspension spring 31 and the bottom of the top board 22 of the sliding connector 20 and in one of the other two diagonal segments divided by the support frame 21, and abuts against the top end of the front suspension spring 31. The other end of the front brake cable 51 is securely mounted in a bottom of the front brake cable block 511. When the rear suspension spring 33 is available, one end of the rear brake cable 52 sequentially penetrates through the rear suspension spring 33, the bottom board 23 of the sliding connector 20 and the bottom cover 13 of the housing 10 to be connected with the rear brake. The rear brake cable block 521 is movably mounted between a top end of the rear suspension spring 33 and the bottom of the top board 22 and located in the other of the other two diagonal segments divided by the support frame 21. A bottom of the rear brake cable block 521 abuts against the top end of the rear suspension spring 33. The other end of the rear brake cable 52 is securely mounted in the bottom of the rear brake cable block 521. When the rear suspension spring 33 is unavailable, the rear brake cable block 521 is mounted on the top of the bottom board 23. One end of the rear brake cable 52 sequentially penetrates through the bottom board 23 of the sliding connector 20 and the bottom cover 13 of the housing 10 to be connected with the rear brake, and the other end of the rear brake cable 52 is securely mounted in the bottom of the rear brake cable block 521.

With reference to FIGS. 4A to 4D, when the cycle is stopped by applying the brake, whether the left lever 2 or the right lever 3 is squeezed individually or both of them are squeezed simultaneously, the left lever block 411, the right lever block 421 or both of them are respectively pulled up by the left lever cable 41 or the right lever cable 42 or both of them so as to lift up the sliding connector 20 inside the housing 10. When the sliding connector 20 is moved up and the front brake cable block 511 and the rear brake cable block 521 stay at rest, the front suspension spring 31 and the front anti-lock spring 32 of the front delaying and anti-lock spring set 30 and the rear suspension spring 33 are simultaneously compressed between the bottom board 23 of the sliding connector 20 and the corresponding one of the front brake cable block 511 and the rear brake cable block 521. Due to the smaller spring constant, the front suspension spring 31 is compressed first. As the compression force of the front suspension spring 31 is small, the minor compression force slightly pulls the front brake cable 51 without fully actuating the front brake. In other words, the front suspension spring 31 suspends a brake action initiated from squeezing the left lever 2 and holds the front brake from fully stopping the front wheel at the first moment after applying brake. After the front suspension spring 31 is compressed to be identical to the front anti-lock spring 32 in height, the suspension time is finished and the front suspension spring 31 and the front anti-lock spring 32 are simultaneously compressed between the bottom board 23 of the sliding connector 20 and the front brake cable block 511. The resultant restoring elastic force released by the front suspension spring 31 and the front anti-lock spring 32 pulls the front brake cable 51 to start actuating the front brake. However, for sake of safety concern, even when the front anti-lock spring 32 is compressed to the extreme, the rear brake is not locked up and the rear wheel is not fully stopped until a predetermined speed of the cycle is met.

When the first suspension and anti-lock spring set 30 is compressed during a brake action, the rear suspension spring 33 is simultaneously compressed between the bottom board 23 of the sliding connector 20 and the rear brake cable block 521. After suspending the brake action for a period of time, the restoring elastic force released by the rear suspension spring 33 pulls the rear brake cable 52 to start actuating the front brake. As the spring constant of the rear suspension spring 33 is smaller than those of the front suspension spring 31 and the front anti-lock spring 32, the suspension time provided by the rear suspension spring 33 is shorter than that provided by the front suspension spring 31. In other words, after being suspended, the rear brake is actuated earlier than the front brake. The rear suspension spring 33 is optional. If the rear suspension spring 33 is not equipped, the rear wheel is immediately stopped by the rear brake after a brake action, the slowed but not locked front wheel drags the fully locked rear wheel to move forward. As long as the handlebars are held firmly and the cycle moves along a straight line, the cycle may not end up overturning and drifting. The availability and the spring constant of the rear suspension spring 33 may be determined by a customer's demand.

After the left lever 2 or the right lever 3 or both of them are released, the restoring elastic forces of brake springs of the front brake and the rear brake 3 and of the left brake lever 2 and the right brake lever 3 rapidly drop the sliding connector 20 down to the original position for a next brake action.

With reference to FIGS. 6A to 6D and 7, to have more precise brake capability, the brake control device 1 further has a brake gap fine tuning module 60 composed of a gap adjustment gauge 61 and a fine tuning set 62. The gap adjustment gauge 61 can be inserted between a brake shoe and a rim of the front wheel or the rear wheel during a brake gap adjustment process and takes the form of a flat plate. The gap adjustment gauge 61 may have different thickness to fit with different adjustment needs, and has an elongated flange 611 and at least one cylinder 612. The elongated flange 611 is formed on and protrudes horizontally or obliquely from a top edge of the gap adjustment gauge 61. The gap adjustment gauge 61 may have one cylinder 612 or two cylinders 612 formed on and protruding horizontally from one side or two opposite sides of the gap adjustment gauge 61.

Figure 7:
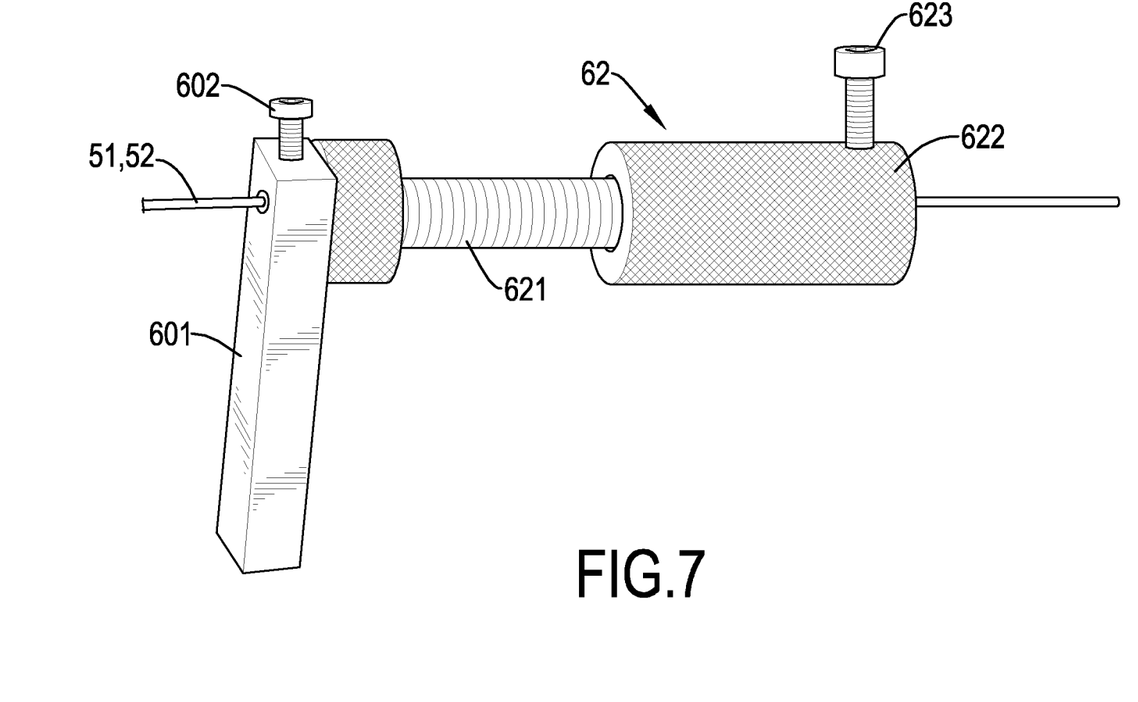
FIG. 7 is a perspective view of a brake gap fine tuning module of the brake gap adjustment of the sequential brake control device in FIG. 2.

With reference to FIG. 7, the fine tuning set 62 has a hollow fine tuning bolt 621 and a hollow fine tuning nut 622. The fine tuning nut 622 is mounted around the fine tuning bolt 621 and has a first cable fastening bolt 623 mounted into the fine tuning nut 622 to lock the fine tuning nut 622 around the front brake cable 51 or the rear brake cable 52 that is mounted through the fine tuning nut 622 and the fine tuning bolt 621. The brake arm 601 has a second cable fastening bolt 602 mounted thereon.

When a gap between a brake shoe and a rim of the front wheel or the rear wheel is adjusted, the fine tuning set 62 is mounted around an end of a corresponding brake cable 51,52. The fine tuning nut 622 is mounted securely around the brake cable 51,52 by the first cable fastening bolt 623, and the head of the fine tuning bolt 621 abuts against one side of the brake arm 601. The second cable fastening bolt 602 on the brake arm 601 is untied, and the fine tuning bolt 621 is turned in a direction away from the rim so as to widen the gap between the brake shoe and the rim firstly. Then, the gap adjustment gauge 61 is inserted into the gap between the brake shoe and the rim, and the elongated flange 611 on the top edge of the gap adjustment gauge 61 is placed on a top surface of the brake shoe so that the gap adjustment gauge 61 is hung on the brake shoe. The fine tuning bolt 621 is further turned to push the brake arm 601 toward the rim so as to tightly sandwich the gap adjustment gauge 61 between the brake shoe and the rim. Because the fine tuning bolt 621 abuts against the side of the brake arm 601, the gap set up by thickness of the gap adjustment gauge 61 can be maintained. After the adjusting process, the adjusted wheel is rotated and the gap adjustment gauge 61 may come off from the gap between the brake shoe and the rim if surface of the gap of the wheel is smooth and not deformed. Consequently, the second cable fastening bolt 602 is tightly screwed and the fine tuning set 62 is removed from the corresponding brake cable 51,52. However, if the surface of the rim is not smooth and has slight deformation, the rim will rub against the gap adjustment gauge 61. Before the adjusting process, preferably, the rim must be calibrated for its smoothness and curvature. Meanwhile, the fine tuning bolt 621 is rotated to be away from the rim to enlarge the gap between the brake shoe and the rim to be larger than the thickness of the gap adjustment gauge 61 until no intermittent abrasion between the rim and the gap adjustment gauge 61 occurs. The enlarged gap may be the least common multiple of a standard gap value between the brake shoe and the rim. Consequently, the second cable fastening bolt 602 is tightened, the fine tuning set 62 is removed from the corresponding brake cable 51,52 to complete the gap adjustment between the brake shoe and the rim.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:
1. A sequential brake control device for a cycle adapted to connect to a left brake lever and a right brake lever and adapted to be mounted between a front brake and a rear brake of the cycle, the sequential brake control device comprising:
   a housing having:
      a top and a bottom;
      a chamber defined in the housing; and
      a top cover and a bottom cover respectively covering the top and the bottom of the housing;
   a sliding connector movably mounted in the chamber of the housing, being movable in a top-down direction, and having:
      a top board having a bottom;
      a bottom board having a top; and
      a support frame mounted between the top board and the bottom board;
   a front delaying and anti-lock spring set mounted in the sliding connector and having:
      a front anti-lock spring having a top end and a bottom end; and
      a front suspension spring mounted in the front anti-lock spring and having a top end and a bottom end;
   wherein when the front suspension spring and the front anti-lock spring are mounted in the sliding connector, the bottom ends of the front suspension spring and the front anti-lock spring abut against the top of the bottom board, and the top end of the front suspension spring protrudes beyond a top end of the front anti-lock spring;
   a lever control cable set having a left lever cable and a right lever cable, wherein one end of each of the left lever cable and the right lever cable is connected to a corresponding one of the left lever and the right lever, the other end of each of the left lever cable and the right lever cable penetrates through the top cover of the housing, is connected to the top board of sliding connector, and is securely mounted in a corresponding one of a left lever block and a right lever block; and
   a brake control cable set having:
      a front brake cable block movably mounted between the top end of the front suspension spring and the bottom of the top board of the sliding connector, abutting against the top end of the front suspension spring, and having a bottom;

a front brake cable, wherein one end of the front brake cable sequentially penetrates through the front suspension spring and the first anti-lock spring of the front delaying and anti-lock spring set, the bottom board of the sliding connector and the bottom cover of the housing to be adapted to connect with the front brake, and the other end of the front brake cable is securely mounted in the bottom of the front brake cable block;

a rear brake cable block mounted on the top of the bottom board and having a bottom; and a rear brake cable, wherein one end of the rear brake cable sequentially penetrates through the bottom board of the sliding connector and the bottom cover of the housing to be adapted to connect with the rear brake, and the other end of the rear brake cable is securely mounted in the bottom of the rear brake cable block.

2. The sequential brake control device as claimed in claim 1 further comprising a rear suspension spring, wherein the rear suspension spring is mounted in the sliding connector and beside the front delaying and anti-lock spring set, and a bottom end of the rear suspension spring abuts against the top of the bottom board, the rear brake cable block is movably mounted between a top end of the rear suspension spring and the bottom of the top board and a bottom end of the rear brake cable block abuts against the top end of the rear suspension spring, and one end of the rear brake cable sequentially penetrates through the rear suspension spring, the bottom board of the sliding connector and the bottom cover of the housing to be adapted to connect with the rear brake and the other end of the rear brake cable is securely mounted in the bottom of the rear brake cable block.

3. The sequential brake control device as claimed in claim 2, wherein the housing further has two open sides formed through the top and the bottom of the housing, the top cover and the bottom cover respectively cover the two open sides, the support frame is cross-shaped and divides a space between the top board and the bottom board into four segments, the left lever cable and the right lever cable are respectively mounted through two diagonal segments divided by the support frame, and the front brake cable and the rear brake cable are respectively mounted through the other two diagonal segments divided by the support frame.

4. The sequential brake control device as claimed in claim 1, wherein the housing further has two open sides formed through the top and the bottom of the housing, the top cover and the bottom cover respectively cover the two open sides, the support frame is cross-shaped and divides a space between the top board and the bottom board into four segments, the left lever cable and the right lever cable are respectively mounted through two diagonal segments divided by the support frame, and the front brake cable and the rear brake cable are respectively mounted through the other two diagonal segments divided by the support frame.

5. A sequential brake control device of a cycle adapted to connect to a left brake lever and a right brake lever and adapted to be mounted between a front brake and a rear brake of the cycle, the brake control device comprising:

a housing having:
a top and a bottom;
a chamber defined in the housing; and
a top cover and a bottom cover respectively covering the top and the bottom of the housing;

a sliding connector movably mounted in the chamber of the housing, being movable in a top-down direction, and having:
a top board having a bottom;
a bottom board having a top; and
a support frame mounted between the top board and the bottom board;

a front delaying and anti-lock spring set mounted in the sliding connector and having:
a top end and a bottom end;
a suspension section having a bottom end; and
an anti-lock section formed on the bottom end of the suspension section, and having a larger pitch than that of the suspension section, wherein the bottom end of the anti-lock section abuts against the top of the bottom board;

a lever control cable set having a left lever cable and a right lever cable, wherein one end of each of the left lever cable and the right lever cable is connected to a corresponding one of the left lever and the right lever, the other end of each of the left lever cable and the right lever cable penetrates through the top cover of the housing, is connected to the top board of the sliding connector, and is securely mounted in a corresponding one of a left lever block and a right lever block; and a brake control cable set having:
a front brake cable block movably mounted between the top end of the front delaying and anti-lock spring set and the bottom of the top board of the sliding connector, abutting against the top end of the front delaying and anti-lock spring set, and having a bottom;

a front brake cable, wherein one end of the front brake cable sequentially penetrates through the front delaying and anti-lock spring set, the bottom board of the sliding connector and the bottom cover of the housing to be adapted to connect with the front brake, and the other end of the front brake cable is securely mounted in the bottom of the front brake cable block;

a rear brake cable block mounted on the top of the bottom board and having a bottom; and a rear brake cable, wherein one end of the rear brake cable sequentially penetrates through the bottom board of the sliding connector and the bottom cover of the housing to be adapted to connect with the rear brake, and the other end of the rear brake cable is securely mounted in the bottom of the rear brake cable block.

6. The sequential brake control device as claimed in claim 5 further comprising a rear suspension spring, wherein the rear suspension spring is mounted in the sliding connector and beside the front delaying and anti-lock spring set, and a bottom end of the rear suspension spring abuts against the top of the bottom board, one end of the rear brake cable sequentially penetrates through the rear suspension spring, the bottom board of the sliding connector and the bottom cover of the housing to be adapted to connect with the rear brake, and the rear brake cable block is movably mounted between a top end of the rear suspension spring and the bottom of the top board and a bottom end of the rear brake cable block abuts against the top end of the rear suspension spring, and the other end of the rear brake cable is securely mounted in the bottom of the rear brake cable block.

7. The sequential brake control device as claimed in claim 6, wherein the housing further has two open sides formed through the top and the bottom of the housing, the top cover and the bottom cover respectively cover the two open sides, the support frame is cross-shaped and divides a space between the top board and the bottom board into four segments, the left lever cable and the right lever cable are respectively mounted through two diagonal segments divided by the support frame, and the front brake cable and the rear brake cable are respectively mounted through the other two diagonal segments divided by the support frame.

8. The sequential brake control device as claimed in claim 5, wherein the housing further has two open sides formed through the top and the bottom of the housing, the top cover and the bottom cover respectively cover the two open sides, the support frame is cross-shaped and divides a space between the top board and the bottom board into four segments, the left lever cable and the right lever cable are respectively mounted through two diagonal segments divided by the support frame, and the front brake cable and the rear brake cable are respectively mounted through the other two diagonal segments divided by the support frame.

\* \* \* \* \*